United States Patent [19]

Shindo et al.

[11] Patent Number: 4,954,065
[45] Date of Patent: Sep. 4, 1990

[54] MASTER DISK

[75] Inventors: Koji Shindo; Masaru Tsuchihashi, both of Amagasaki, Japan

[73] Assignee: Mitsubishi Denki Kabushiki Kaisha, Tokyo, Japan

[21] Appl. No.: 406,848

[22] Filed: Sep. 14, 1989

Related U.S. Application Data

[63] Continuation of Ser. No. 154,339, Feb. 10, 1988, abandoned.

[30] Foreign Application Priority Data

Mar. 24, 1987 [JP] Japan ................... 62-69478

[51] Int. Cl.$^5$ ............................. B29C 33/42
[52] U.S. Cl. ................... 425/175; 249/187.1; 364/1.3; 364/107; 369/282; 369/290; 425/177; 425/810; 428/65; 428/694
[58] Field of Search ............... 425/810, 406, 150, 175, 425/177; 264/1.3, 5, 2.5, 40.5, 106, 107; 249/117, 175, 187.1, 205; 428/65, 694; 369/282, 290

[56] References Cited

U.S. PATENT DOCUMENTS

| 1,226,674 | 5/1917 | Kitchen | 369/282 X |
| 1,821,916 | 9/1931 | Acheson et al. | 369/282 |
| 1,846,378 | 2/1932 | Acheson | 369/282 |
| 1,907,026 | 5/1933 | Woock | 264/40.5 |
| 3,368,007 | 2/1968 | Palmer | 264/40.5 X |
| 4,060,839 | 11/1977 | Meadows | 369/282 X |
| 4,177,229 | 12/1979 | Moore | 264/40.5 |
| 4,188,240 | 2/1980 | Yoshio | 264/107 X |
| 4,435,343 | 3/1984 | Ando et al. | 425/810 X |
| 4,437,641 | 3/1984 | Stavitsky et al. | 425/810 X |
| 4,447,381 | 5/1984 | Matey | 425/810 X |
| 4,522,659 | 6/1985 | Prusak | 425/810 X |
| 4,527,971 | 7/1985 | Strausfeld et al. | 425/810 X |
| 4,767,486 | 8/1988 | Nakajima et al. | 425/810 X |
| 4,772,196 | 9/1988 | Asai | 425/810 X |
| 4,814,928 | 3/1989 | Ito et al. | 428/694 X |
| 4,827,469 | 5/1989 | Peeters | 425/810 X |

FOREIGN PATENT DOCUMENTS

| 217246 | 12/1984 | Japan | 369/282 |
| 61-34613 | 10/1986 | Japan . | |
| 61-276146 | 12/1986 | Japan . | |

*Primary Examiner*—Richard L. Chiesa
*Attorney, Agent, or Firm*—Burns, Doane, Swecker & Mathis

[57] ABSTRACT

The present invention relates to a master disk used as a matrix for manufacturing a stamper by transferring, which is used for reproducing an optical disk, the master disk according to the present invention is provided with an appointed number of calibration tracks formed at an appointed pitch symmetrically relative to the center of guide tracks in the area including a position corresponding to an edge portion of a center hole of the stamper, whereby the center hole of the stamper can be easily formed concentrically with the guide tracks of the master disk and the tolerance of diameter of the center hole or the eccentricity between the center of the center hole and the center of the guide track can be easily measured.

7 Claims, 7 Drawing Sheets

MASTER DISK

This application is a continuation of application Ser. No. 154,339, filed Feb. 10, 1988, now abandoned.

BACKGROUND OF THE INVENTION

1. Field of the Invention

The present invention relates to a master disk used as a matrix for manufacturing a stamper by transferring, which is used for reproducing an optical disk made of for example a resin.

2. Description of the Prior Art

FIG. 1 is a process chart showing the conventional manufacturing process of the conventional optical disk;

FIG. 2 is a plan view showing the conventional master disk manufactured by the manufacturing process shown in FIG. 1; and FIG. 3 is a plan view showing the conventional stamper made of a metal manufactures by transferring the master disk shown in FIG. 2 by electroforming.

Referring now to FIG. 2, reference numeral 1 designates a master disk formed by recording the information which has been previously compiled by the laser cutting, on an original regist plate formed by applying a photoregist on a surface of a polished glass plate. The master disk 1 is provided with a recording track periphery 2, on which the informations are recorded, and a recording track inside circumference 3, on which the informations are recorded likewise, formed concentrically.

In addition, referring to FIG. 3, reference numeral 11 designates a metallic stamper obtained by transferring a pattern of the master disk 1 by electroforming with the master disk 1 as the matrix and cutting. The stamper 11 is provided with a transfer recording track periphery 12, on which the recording track periphery 2 is recorded, and a transfer recording track inside circumference 13, on which the recording track inside circumference 3 is recorded. In addition, reference numeral 14 designates a center hole formed in a central portion of the stamper 11.

The manufacturing process of the master disk 1, the stamper 11 and the optical disk is described below with reference to FIG. 1.

At first, the glass plate is machined to form a disk having an appointed diameter and a center is positioned and then, the surface is polished followed by washing and drying. And, the photoregist serving as a recording film is applied on this surface and then, the applied photoregist is subjected to a heat treatment to prepare the original regist plate.

The prepared original regist plate is inspected on a defect of the recording film and film thickness and the original regist plate, which passed an inspection, is placed on a turntable so that a center of the original regist plate may coincide with a center of the turntable. Subsequently, the original regist plate is subjected to an exposure to a laser beam modulated in correspondence to the information signal, which has been previously compiled, that is, a laser cutting with rotating. Then, the development and etching are carried out to form the master disk 1 on which a pattern of the information signal is sensible with exposed portions and non-exposed portions as an uneven relief. Accordingly, the center of the recording track periphery 2 and that of the recording track inside circumference 3 of the master disk 1 coincide with a rotation center of the master disk 1 and a spiral recording track is formed between the recording track periphery 2 and the recording track inside circumference 3 with the rotation center of the master disk 1 as a fixed point.

Subsequently, this master disk 1 as the matrix is made electrically conductive on the surface thereof and then, nickel is electroformed on the surface of the master disk 1 to prepare the metallic original plate on which the pattern of the master disk 1 has been transferred. Then, in order to obtain the stamper meeting a metallic mold of an injection molding machine from this original metallic plate, the center hole 14 is formed and a periphery of the center hole 14 is subjected to a cutting process. The formation of this center hole 14 and the cutting process of the periphery of the center hole 14 are carried out by punching using a press, shearing, cutting by the use of a laser, cutting out by the use of a lathe but it is required that the center hole 14 is concentric with the rotation center of the master disk 1 in accordance with the center of the recording track transferred from the master disk 1. Accordingly, the center hole 14 is formed in high accuracy so that the center of the center hole 14 may coincide with the center of for example the recording track periphery 12 transferred from the master disk 1 and an eccentricity between the center of the formed center hole 14 and the center of the recording track transferred form the master disk 1 is strictly controlled.

The stamper 11, which has been finished through the above described manufacturing process and passed an inspection, is placed in a metallic mold of the injection molding machine to mold a resin. Thus, the optical disk made of resin having the quite same pattern as the pattern of the master disk 1 transferred on the stamper 11 is reproduced.

With the above described master disk 1, since it is required that the center of the center hole 14 and that of the recording track are concentric to each other when the center hole 14 of the stamper 11 is formed, the highly accurate cutting process, in which the center of the center hole 14 coincides with for example the center of the recording track periphery 12, must be carried out, that is, an advanced skill is requied. In addition, a precise operation must be carried out for a long time using a precision length measuring machine when a tolerance of diameter of the center hole 14, the eccentricity between the center of the center hole 14 and for example the center of the recording track periphery 12 and the like of the stamper 11, which finished the formation of the center hole and the cutting process of the periphery, are measured. In addition, problems have occurred in that individual variations are to be included in the judgement of the periphery of the cut stamper 11 and the edge portion of the center hole 14 in addition to the above described problems.

SUMMARY OF THE INVENTION

The present invention has been achieved for solving the above described problems.

A first object of this invention is to provide a master disk capable of easily forming a center hole of a stamper so as to be concentric with guide tracks by forming an appointed number of calibration tracks at appointed pitch in a symmetrical relation relative to the center of the guide tracks in the area including a position corresponding to an edge portion of the center hole.

A second object of this invention is to provide a master disk capable of easily measuring an eccentricity between the center of the center hole and the center of the guide tracks by selecting the calibration track as a graduation on axes meeting at right angels to each other.

A third object of this invention is to provide a master disk capable of reading a number graduations by enlarging a size of display every appointed number of graduations on the axes meeting at right angles to each other.

A fourth object of this invention is to provide a master disk capable of measuring the eccentricity of the center hole by selecting graduations on two sets or more of axes meeting at right angles to each other shifted by an appointed angle with the same one zero point as the calibration tracks.

A fifth object of this invention is to provide a master disk capable of easily forming the center hole in concentrical relation with the guide tracks by selecting concentrical graduations as the calibration tracks.

A sixth object of this invention is to provide a master disk capable of forming the center hole having a diameter within an allowable range by selecting the concentric graduations as the calibration track, coinciding the outermost circumferential graduation of the concentric graduations with the allowable upper limit of the center hole and coinciding the innermost graduation of the concentric graduations with the allowable lower limit of the center hole.

The above and further objects and features of the invention will more fully be apparent from the following detailed description with accompanying drawings.

DESCRIPTION OF THE PREFERRED EMBODIMENTS

The preferred embodiments of the present invention are described below concretely.

Figure 4:
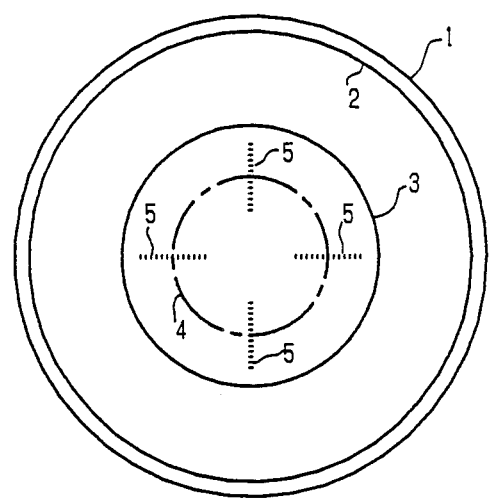
FIG. 4 is a plan view showing one preferred embodiment of a master disk according to the present invention.

FIG. 4 is a plan view showing one preferred embodiment of a master disk according to the present invention and FIGS. 5 to 9 are an enlarged plan view showing the main ingredients of the master disk shown in FIG. 4. Referring to FIGS. 4 to 9, reference numeral 1 designates a master disk, reference numeral 2 designating a recording track periphery, on which the previously compiled informations are recorded, of the master disk 1, reference numeral 3 designating a recording track inside circumference of the master disk 1, on which the previously compiled informations are recorded of the master disk 1, and reference numeral 4 designating a center hole-corresponding line to the center hole (not shown) of the stamper (not shown) prepared by transferring the master disk 1 as the matrix.

The master disk 1 according to the present invention is characterized by that the calibration track 5, which becomes an index when the center hole of the stamper is formed, is formed on the master disk 1. The calibration track 5 is an appointed number of graduations (in this preferred embodiment every 31 graduations in four directions) disposed at regular intervals on the axes meeting at right angles to each other with the center of the recording track periphery 2 as the zero point and said center hole-corresponding line therebetween, and these graduations are recorded on the master disk 1 together with the previously compiled informations.

Figure 1:
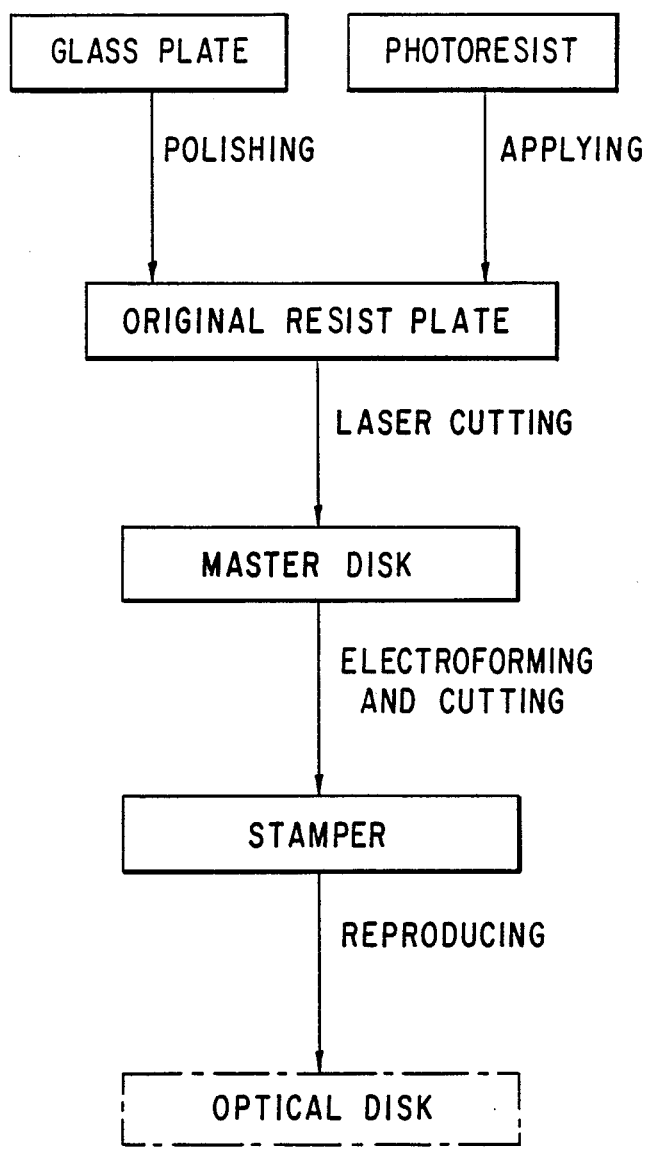
FIG. 1 is a process chart showing a manufacturing process of an optical disk.
Figure 2:
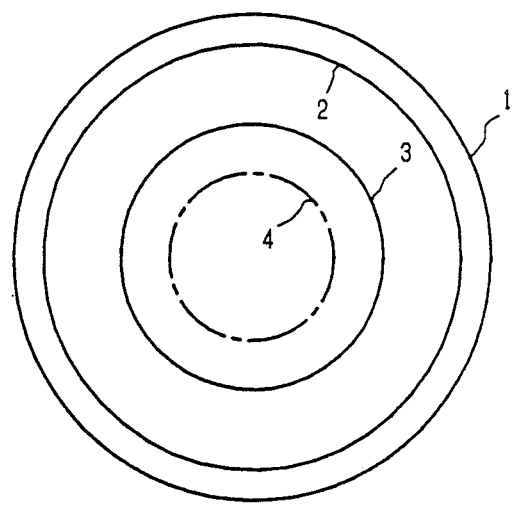
FIG. 2 is a plan view showing the conventional master disk.

The master disk 1, which has been constructed in such a manner, is prepared through the manufacturing process shown in FIG. 1 in the same manner as the conventional master disk 1. The original regist plate is subjected to the laser cutting by a laser beam modulated corresponding to a signal of the previously compiled informations and a signal of the calibration track 5 and then, developed to obtain the master disk 1 containing the sensible signal of the informations and that of the calibration track 5.

The master disk 1, which has been obtained in such a manner, is used as the matrix to prepare the original metallic plate, on which the pattern of the master disk 1 has been transferred, and then, in order to make the original metallic plate into the stamper meeting the metallic mold of the injection molding machine, the center hole is formed and the periphery of the center hole is cut. At this time, the center hole is opened so as to be concentric with for example the recording track periphery which is the guide track concentric with the rotation center of the master disk 1.

Figure 5:
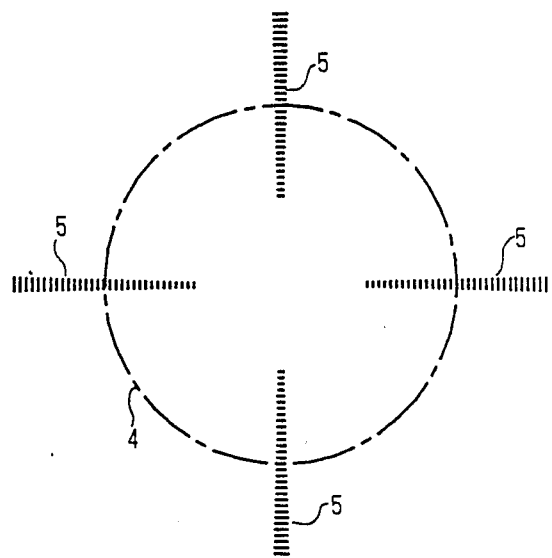
FIGS. 5, 6, 7, 8, 9, are an enlarged plan view showing the main ingredients of the preferred embodiment shown in FIG. 4.
Figure 6:
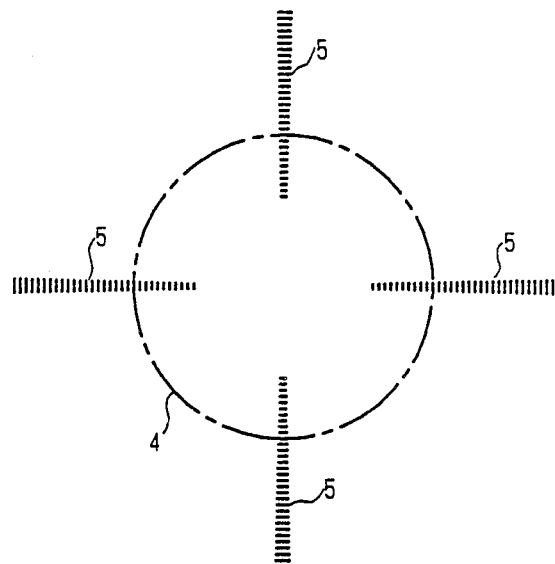
Figure 7:
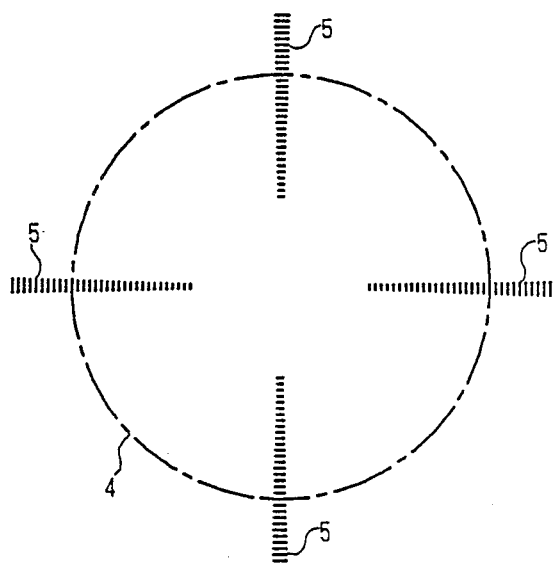
Figure 8:
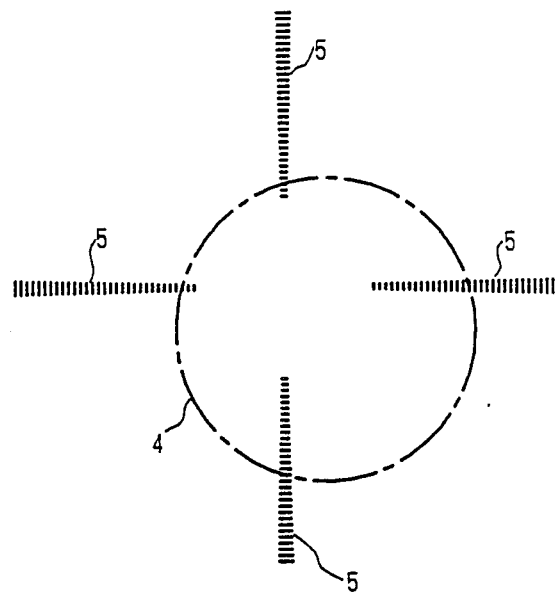
Figure 9:
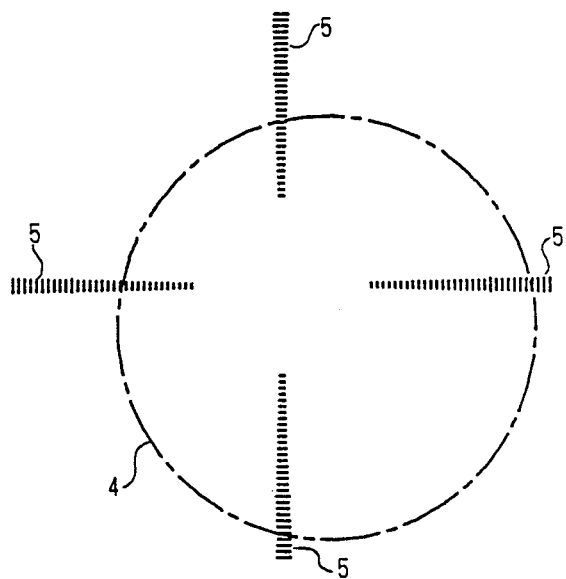

A correspondence of the center hole, which is formed in such a manner, to the master disk 1 is shown in FIGS. 5 to 9. Referring to FIGS. 5 to 9, a circle represented by a dotted chain line shows the center hole-corresponding line 4 corresponding to the center hole opened in the stamper. FIGS. 5 to 7 show the case wherein the center hole is concentric with the recording track periphery and has different diameters depending upon the figures while FIGS. 8, 9 show the case wherein the center hole is eccentric from the center of the recording track periphery and has differnt diameters depending upon the figures.

FIG. 5 shows an example in which the center hole having an appointed diameter is opened at an appointed position. In this case, the center hole-corresponding line 4 is concentric with the calibration track 5 and 15 graduations are observed on the stamper in the direction of axis of ordinate and the direction of axis of abscissa, respectively.

FIG. 6 shows an example in which the center hole-corresponding line 4 is concentric with the calibration track 5 and 20 graduations are observed on the stamper in the direction of axis of ordinate and the direction of axis of abscissa, respectively. In this case, the center hole is formed so as to be smaller than the appointed diameter by 10 graduations and concentric with the calibration track 5 (the recording track periphery 3).

FIG. 7 shows an example in which the central hole-corresponding line 4 is concentric with the calibration track 5 and 10 graduations are observed on the stamper in the direction of axis of ordinate and the direction of axis of abscissa, respectively. In this case, the center hole is formed so as to be larger than the appointed diameter by 10 graduations and concentric with the calibration track 5 (the recording track periphery 3).

FIG. 8 shows an example in which the center hole-corresponding line 4 is eccentric from the center of the calibration track 5 and 28 graduations and 14 graduations are observed on the stamper in the direction of axis of ordinate and 14 graduations and 28 graduations are observed on the stamper in the direction of axis of abscissa. In this case, the center hole is formed so as to be smaller than the appointed diameter by 10 graduations and eccentric from the calibration track 5 (the recording track periphery 3) by about 10 graduations. In addition, this eccentric quantity of 10 graduations is calculated by the following formula (1):

$$\sqrt{[(28-14)/2]^2 + [(28-14)/2]^2} \approx 10 \quad (1)$$

In addition, FIG. 9 shows an example in which the center hole-corresponding line 4 is eccentric from the center of the calibration track 5 and 18 graduations and 4 graduations are observed on the stamper in the direction of axis of ordinate and 4 graduations and 18 graduations are observed oin the stamper in the direction of axis of abscissa. In this case, the center hole is formed so as to be larger than the appointed diameter by about 10 graduations and cut so as to be eccentric from the center of the calibration track 5 (the recording track periphery 3). In addition, this eccentric quantity of 10 graduations is calculated by the following formula (2):

$$\sqrt{[(18-4)/2]^2 + [(4-18)/2]^2} \approx 10 \quad (2)$$

Thus, the tolerance of diameter of the center hole of the stamper and the eccentricity between the center of the center hole and the guide track (for example the recording track periphery 3) can be easily measured by reading the number of graduation in the calibration track 5 of the stamper.

Figure 3:
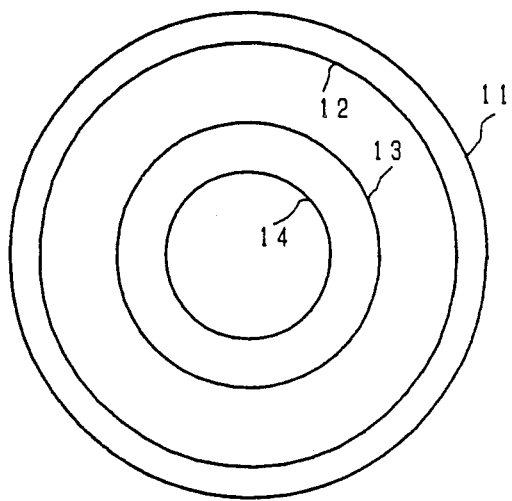
FIG. 3 is a plane view showing the conventional stamper.
Figure 10:
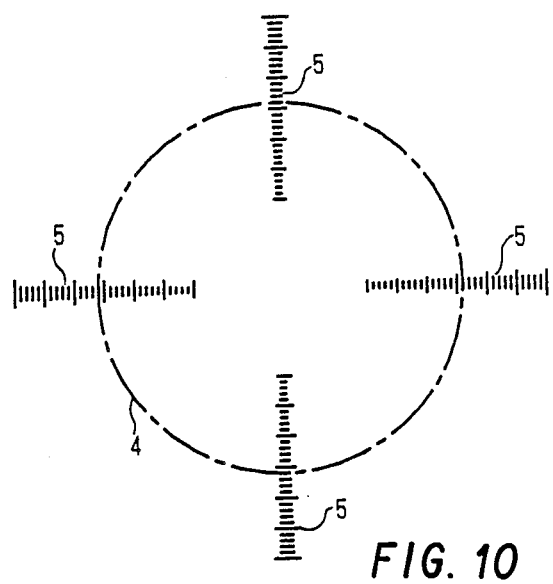
FIGS. 10, 11 are a plan view showing the main ingredients of another preferred embodiment according to the present invention.

FIG. 10 shows another preferred embodiment of the case in which the calibration track 5 is disposed on axes meeting at right angles with each other with the center of the recording track periphery 3 as the zero point in the same manner as in the preferred embodiment shown in FIG. 3. In this preferred embodiment, the display of the graduations disposed on axes meeting at right angles with each other is large-sized every 5 graduations. In this preferred embodiment, the graduations are easy to be read in comparison with the above described preferred embodiment.

Figure 11:
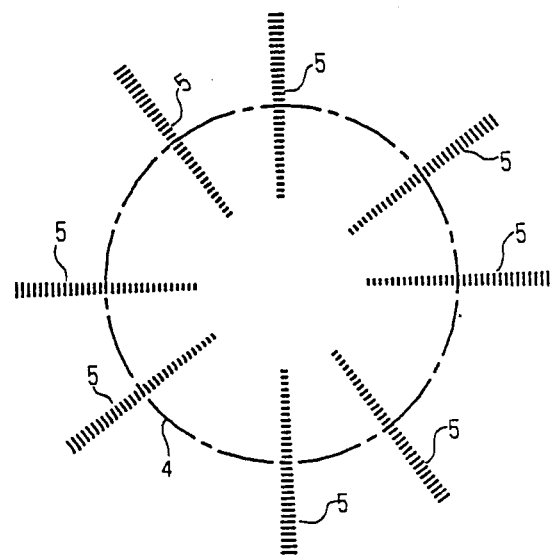

In every one of the above described preferred embodiments, the calibration track 5 is adapted to be disposed on the axes meeting at right angles with each other with the center of the recording track periphery 3 as the zero point and the center hole corresponding line 4 put therebetween but the calibration track 5 may be adapted to be disposed on two sets of axes meeting at right angles with each other with the same zero point and shifted by an appointed angle. In this preferred embodiment, the circularity of the center hole can be measured. In addition, FIG. 11 shows the case in which two sets of axes meeting at right angles with each other are used but a construction, in which three or more sets of axes meeting at right angles with each other are graduated, may be adopted.

Figure 12:
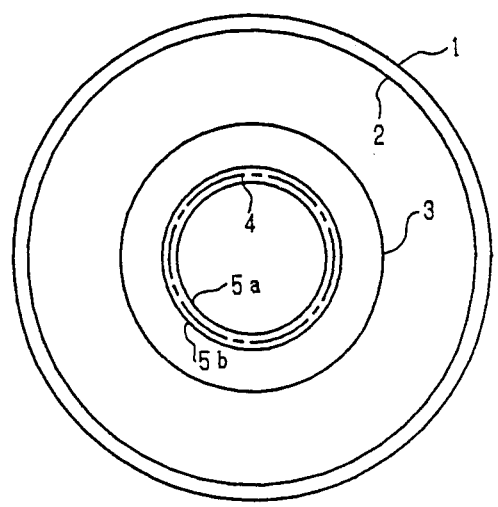
FIG. 12 is a plan view showing still another preferred embodiment according to the present invention.

FIG. 12 is a plan view showing another preferred embodiment of the calibration track 5 formed in the master disk 1 in which the calibration track 5 is two concentric graduations with the center hole-corresponding line 4, which is concentric with the recording track periphery 3, put therebetween and the diameter of the inside concentric graduation 5a corresponds to the allowable lower limit of the diameter of the center hole while the diameter of the outside concentric graduation 5b corresponds to the allowable upper limit of the center hole. In this preferred embodiment, since the original metallic plate, on which the information of the master disk 1 have been transferred, can be cut with regulating the stage so as to exist between two concentric graduations 5a, 5b by monitoring an edge of cutting tool fixedly mounted on the stage of lathe when the center hole is formed by cutting out by means of a lathe, it is not required to carry out the highly precise positioning and the center hole having a diameter within the allowable range can be easily formed.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A master disk, provided with guide tracks, forming a matrix of a stamper having a center hole whose center is the position corresponding to the center of said guide tracks, having an appointed number of calibration tracks formed at an appointed pitch symmetrically relative to a center of said guide tracks on both sides of a position corresponding to an edge portion of said center hole.

2. A master disk as set forth in claim 1, wherein said calibration tracks are graduations formed on one set of axes meeting at right angles with each other.

3. A master disk as set forth in claim 2, wherein the display of said graduations is large-sized every appointed number of graduations.

4. A master disk as set forth in claim 3, wherein said appointed number of graduations is 5.

5. A master disk as set forth in claim 1, wherein said calibration tracks are graduations formed on at least two sets of axes meeting at right angles with each other with the same cross-point, said sets of axes being shifted by an appointed angle around said same cross-point.

6. A master disk as set forth in claim 1, wherein said calibration tracks are circular graduations concentric with said guide tracks.

7. A master disk as set forth in claim 6, wherein the outermost graduation of said circular graduations corresponds to the allowable upper limit of a diameter of said center hole and the innermost graduation of said circular graduations corresponds to the allowable lower limit of the diameter of said center hole.

* * * * *